3,385,870
SEMICARBAZONES AND THIOSEMICARBAZONES OF 17 - β - ACETONYLOXY - 3 - ALKOXYESTRA-1,3,5(10)-TRIENES
Gerhard R. Wendt, Havertown, and Kurt W. Ledig, Philadelphia, Pa., assignors to American Home Products Corporation, New York, N.Y., a corporation of Delaware
No Drawing. Filed July 1, 1965, Ser. No. 468,927
4 Claims. (Cl. 260—397.4)

ABSTRACT OF THE DISCLOSURE

The invention is directed to the process, and resultant products, of reacting a semicarbazide and a 17β-acetonyloxy-3-alkoxyestra-1,3,5(10)-triene. The compounds have utility in the treatment of hyperlipaemia in mammals.

This invention is directed broadly to a novel group of steroid compounds falling generally within the 1,3,5(10)-estratriene series and to methods for preparing such compounds.

These compounds are potent lipid or cholesterol shifting agents in mammals and thus demonstrate a use characteristic beneficial in the treatment of hyperlipaemia and the like conditions derived therefrom.

The claimed invention resides in the concept of a steroid illustrated by those having the structure:

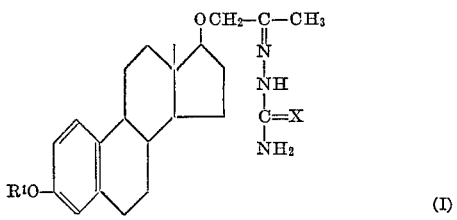

wherein the symbol $R^1$ represents lower alkyl groups having from 1 to 4 carbon atoms, and the most preferred of which are methyl and propyl, and where X is oxygen or sulfur.

The claimed compounds can be prepared as shown below:

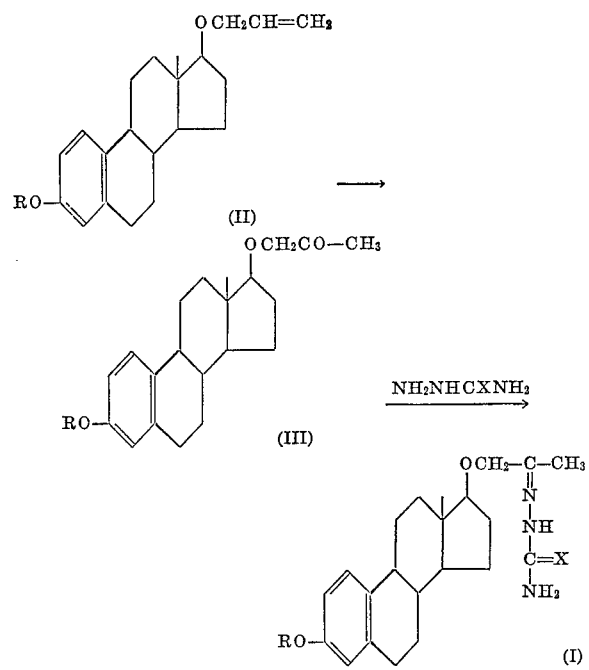

As shown above, the claimed compounds are prepared by treating a 17β-allyloxy-3-alkoxyestra-1,3,5(10) triene (II), prepared as described in our copending application, Ser. No. 310,484, now abandoned, with palladium chloride and quinone in a solvent such as N,N - dimethyl formamide. The reaction mixture is stirred and heated for 3 hours at about 70° C. with a small amount of water being added at regular intervals. Following the end of the reaction, the reaction mixture is mixed with water and extracted with ether to obtain a 17β-acetonyloxy-3-alkoxyestra-1,3,5(10)-triene (III). This compound then is dissolved in methanol and reacted with an excess of semicarbazide or of thiosemicarbazide in water and in the presence of pyridine to give the final product.

The invention is illustrated by the following:

17β-acetonyloxy-3-methoxyestra-1,3,5(10)-triene, semicarbazone

To a supension of 1.7 g. of 17β-allyloxy-3-methoxyestra-1,3,5(10)-triene, 7.5 ml. of N,N-dimethylformamide, 178 mg. of $PdCl_2$ was added 0.6 g. of quinone followed by 0.05 ml. of water. The reaction mixture was stirred and heated at 70° for 3 hours. After the first 30 min. of this period of heating 0.05 ml. of water was added followed by 0.02 ml. of water after an additional hour. The final 0.05 ml. of water was added after another hour and the reaction mixture mixed with water and extracted with ether.

The gum obtained on evaporation of the solvent was dissolved in methanol and treated with an excess of semicarbazide hydrochloride in water in the presence of pyridine to yield the title compound; M.P. 161–163°. (Found: C, 69.34%; H, 8.19%; N, 10.38%. $C_{23}H_{33}O_3N_3$ requires: C, 69.14%; H, 8.33%; N, 10.51%.)

When the steps of the above example are supplied to the following starting materials the products hereinafter disclosed are obtained:

Starting materials:
- 17β - allyloxy-3-ethoxyestra - 1,3,5 (10)-triene.
- 17β - allyloxy-3 - propoxyestra - 1,3,5 (10)-triene.
- 17β - allyloxy-3-butoxyestra - 1,3,5 (10)-triene.

Final product
- 17β-acetonyloxy - 3 - ethoxyestra - 1,3,5(10)-triene, semicarbazone.
- 17β - acetonyloxy-3-propoxyestra - 1,3,5 (10)-triene, semicarbazone.
- 17β - acetonyloxy - 3 - butoxyestra - 1,3,5 (10)-triene, semicarbazone.

Substituting thiosemicarbazide for semicarbazide in the above examples produces the following thiosemicarbazones:

17β-acetonyloxy-3-methoxyestra-1,3,5(10)-triene, thiosemicarbazone;
17β-acetonyloxy-3-ethoxyestra-1,3,5(10)-triene, thiosemicarbazone;
17β-acetonyloxy-3-propoxyestra-1,3,5(10)-triene, thiosemicarbazone;
17β-acetonyloxy-3-butoxyestra-1,3,5(10)-triene, thiosemicarbazone;

In addition to having the capacity to regulate blood lipid levels the compounds of the invention are useful for their general hormonal effect particularly in mammals and exhibit utility in those areas where natural estrogens are employed. When so utilized the effective administered dosage of the compounds of the invention will depend upon the severity of the condition and the individual characteristics of each case wherein they are employed. Generally a dosage range of from about 0.5 mg. to about 20 mg. per kilo of body weight per day would constitute the overall range.

The noval compounds of our invention may be administered in more than one way. They may be administered either orally, intravenously or intramuscularly. When so administered as pharmaceutical products they of course can be administered singly or in combination with other active or inert ingredients in unit dosage form. If desired, they may be combined with a large number of compatible non-toxic diluents, carriers, binders and excipients to form a pharmaceutical preparation. Such typical liquid carriers as water, mineral oil or a non-toxic alcohol may be admixed therewith where preparations suitable for injection are to be prepared. Carboxymethylcellulose, starches, various sugars and the like may be employed where tablets or powders are to be formed as a means of oral administration.

What is claimed is:
1. A compound of the formula:

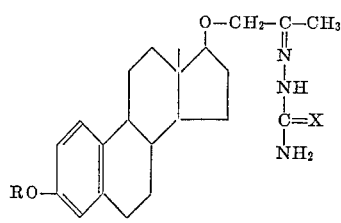

wherein R is a lower alkyl group and X is selected from the group of oxygen and sulfur.

2. A compound of the formula:

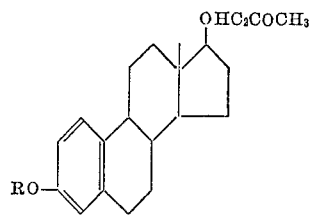

wherein R is lower alkyl.

3. 17β-acetonyloxy-3-methoxyestra-1,3,5 (10) - triene, semicarbazone.

4. The process which comprises treating a 17β-allyloxy-3-alkoxyestra-1,3,5 (10)-triene with water, palladium chloride, and quinone to form the corresponding 17β-acetonyloxy compound and further reacting said compound with a semicarbazide to form the semicarbazone thereof.

References Cited
UNITED STATES PATENTS 3,081,315   3/1963   Bible _____ 260—397.1

OTHER REFERENCES

Jour. Org. Chem., vol. 30, September 1965, pp. 3243–3245.

LEWIS GOTTS, *Primary Examiner.*

JOHNNIE R. BROWN, *Examiner.*

UNITED STATES PATENT OFFICE
CERTIFICATE OF CORRECTION

Patent No. 3,385,870                  May 28, 1968

Gerhard R. Wendt et al.

It is certified that error appears in the above identified patent and that said Letters Patent are hereby corrected as shown below:

Column 4, lines 2 to 9, that portion of the formula reading:

$OHC_2COCH_3$      should read      $OCH_2COCH_3$

Signed and sealed this 9th day of December 1969.

(SEAL)
Attest:

Edward M. Fletcher, Jr.
Attesting Officer

WILLIAM E. SCHUYLER, JR.
Commissioner of Patents